US006047969A

United States Patent [19]

Hoefft et al.

[11] Patent Number: 6,047,969

[45] Date of Patent: Apr. 11, 2000

[54] FACE SEAL ASSEMBLY WITH STATIC SEAL RING

[75] Inventors: Thomas M. Hoefft, Franklin, N.C.; Billy R. Bedford, Peoria; Michael D. Hasselbusch, Metamora, both of Ill.

[73] Assignee: Caterpillar Inc., Peoria, Ill.

[21] Appl. No.: 08/954,320

[22] Filed: Oct. 17, 1997

[51] Int. Cl.[7] .......... F16J 15/38

[52] U.S. Cl. .......... 277/370; 277/390

[58] Field of Search .......... 277/390, 370, 277/399, 382, 375, 380, 403

[56] References Cited

U.S. PATENT DOCUMENTS

| | | | |
|---|---|---|---|
| 3,180,648 | 4/1965 | Kupfert et al. | 277/399 |
| 3,409,306 | 11/1968 | Hayatian | 277/92 |
| 3,452,995 | 7/1969 | Engleking . | |
| 3,524,654 | 8/1970 | Hasselbacher et al. | 277/390 |
| 3,540,743 | 11/1970 | Ashton | 277/399 |
| 3,985,366 | 10/1976 | Plouzek . | |
| 4,077,634 | 3/1978 | Durham | 277/92 |
| 4,087,100 | 5/1978 | Yoshihashi et al. . | |
| 4,351,533 | 9/1982 | Moore . | |
| 5,560,621 | 10/1996 | Zutz | 277/399 |

FOREIGN PATENT DOCUMENTS

| | | |
|---|---|---|
| 1109950 | 2/1956 | France . |

*Primary Examiner*—B. Dayoan
*Assistant Examiner*—Vishal Patel
*Attorney, Agent, or Firm*—John J. Cheek

[57] ABSTRACT

A metal-to-metal face seal assembly comprises a static seal ring secured to a rotating element, such as a track roller of a tracked machine. The static seal ring has a seal face, and a dynamic seal ring has a seal face in sealing engagement with the seal face of the static ring. The dynamic seal ring has a ramp thereon extending at 8 degrees relative to horizontal in a direction away from the seal face thereof. The seal assembly further includes a seal housing, which may be the end collar of the track roller, having an annular ramp formed thereon confronting the ramp of the dynamic seal ring, which seal housing ramp extends at 10 degrees relative to horizontal. The ramps converge in a direction away from a seal plane defined by the mutually-engaging faces of the seal rings. A load ring disposed between the ramps is pre-compressed to its maximum strain level to provide the desired face loads on the seal faces.

10 Claims, 2 Drawing Sheets

10
12
30
30
2
18
18
22
22
22
22
24
24
20
20
16
14

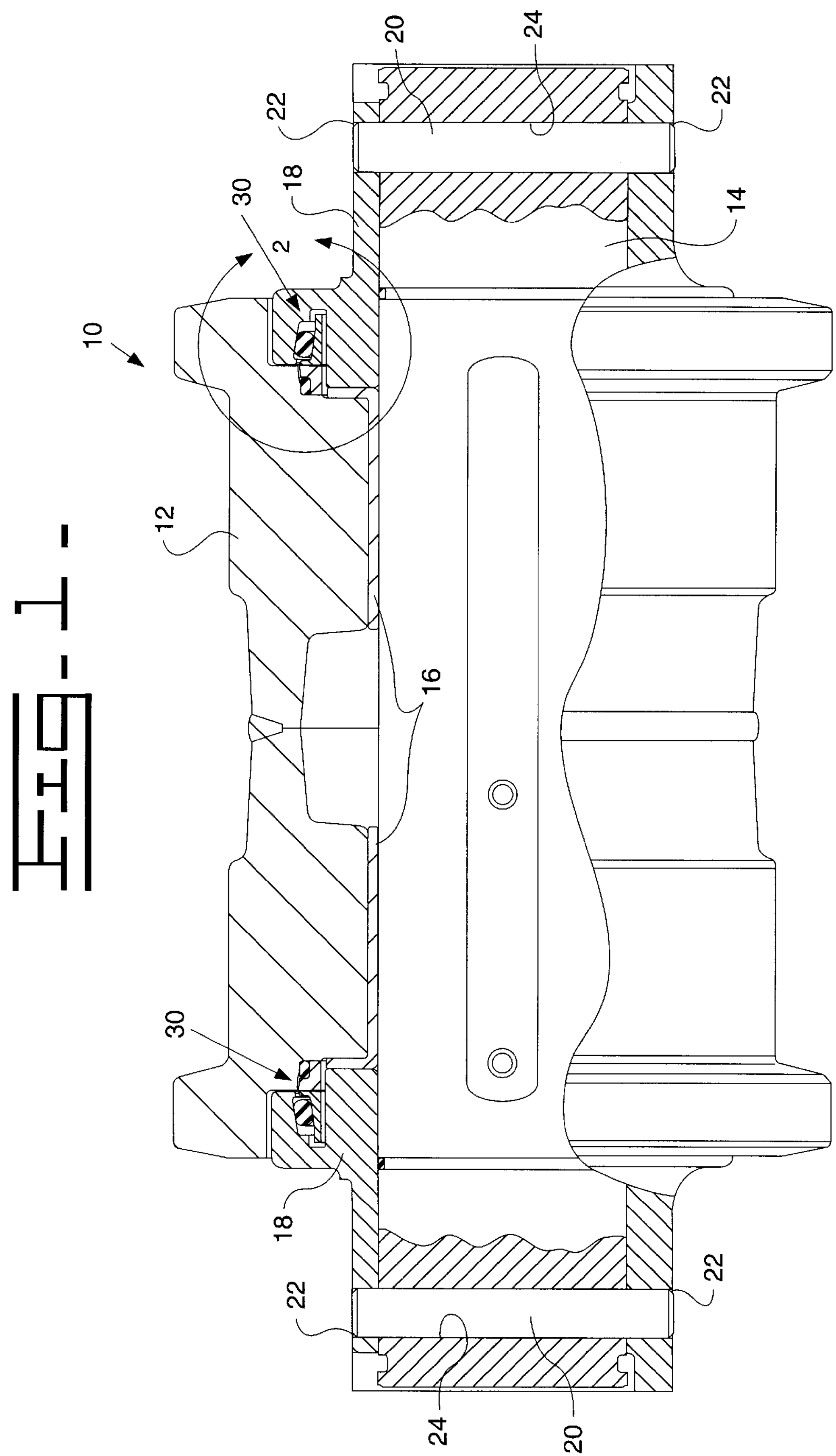
Fig-1-
10
12
14
16
18
2
20
22
24
30

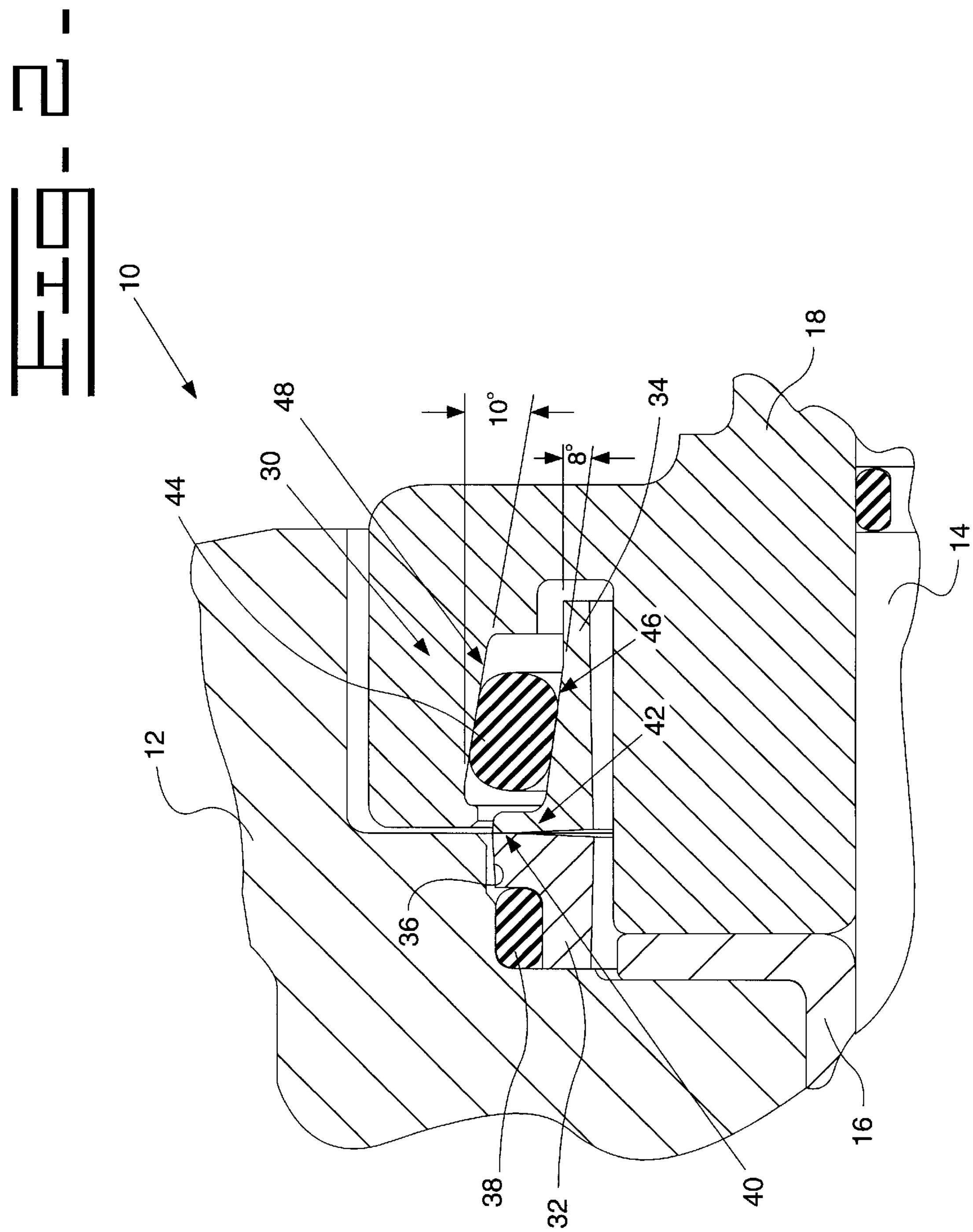
FIG-2-
10
12
14
16
18
30
32
34
36
38
40
42
44
46
48
10°
8°

FACE SEAL ASSEMBLY WITH STATIC SEAL RING

TECHNICAL FIELD

This invention is directed to face seal assemblies for retaining lubricant in and excluding foreign matter from the vicinity of bearing surfaces between relatively rotating parts. More particularly, this invention relates to such a seal assembly that provides adequate sealing without increasing axial space requirements for the seal components.

BACKGROUND ART

Known face seal assemblies for use in constructions having relatively rotating components, such as track roller assemblies of tracked machines, final drives, etc., typically comprise a pair of confronting seal rings of metal or other durable, hard material. The seal rings rotate relative to one another in face-to-face contact to provide a positive face seal which retains lubricant and prevents foreign matter from reaching rotating bearing surfaces of the rotating assembly. One such known seal assembly, which is particularly suited for use in a track roller assembly, comprises a first dynamic, i.e. axially movable, seal ring associated with a rotating track roller and a second dynamic seal ring associated with a non-rotating end collar of the track roller assembly. Each of the seal rings is axially-movable relative to its associated track roller assembly component and is biased toward the other seal ring by a resilient load ring or toric compressed between an angled ramp on the seal ring and a confronting angled ramp on the associated track roller or end collar. The force applied to each seal ring by its respective toric maintains the faces of the seal rings in constant sealing engagement.

A key factor in achieving a fluid-tight face seal is the compression of the torics between their associated ramps. Appropriate toric compression is required to create the face loading needed to maintain a positive seal. It is known in the art to provide a seal ring ramp with an 8 degree angled profile in combination with a confronting ramp having a 10 degree angled profile, with the angles converging in a direction away from the seal face of the subject seal ring. This converging 8/10 degree configuration provides good external pressure resistance, which avoids the effects of mud packing, for example, and also provides relatively flat load vs. deflection characteristics, which reduces large shifts in face loading as a result of axial movement of the seal rings. However, it has been discovered that optimal toric compression for certain seal sizes may require ramps longer than previously used. Accordingly, optimal toric compression utilizing the abovedescribed 8/10 degree seal construction may require greater axial space for the seal components, which precludes optimal toric compression in existing seal applications constructed for use with current, shorter seal ring ramps unless substantial modifications are made to the surrounding structure.

This invention is directed to overcoming one or more of the problems set forth above.

DISCLOSURE OF THE INVENTION

In accordance with this invention, a face seal assembly comprises a first seal ring axially fixed to a rotatable element for rotation therewith about an axis. An annular housing member is spaced axially from the first seal ring and is rotatably fixed with respect to the axis of rotation of the aforementioned rotatable element. A second seal ring is disposed axially intermediate the first seal ring and the annular housing member. The first seal ring has a seal face, and the second seal ring has a seal face confronting and in mutual sealing engagement with the seal faces define a seal plane. The annular housing member has an axially-extending ramp, and the second seal ring further has an axially-extending ramp confronting the ramp of the annular housing member. The ramps converge in a direction away from the seal plane. A bias member is compressed between said first and second angled loading ramps.

BRIEF DESCRIPTION OF THE DRAWINGS

FIG. 1 is an elevational view, partially in cross-section, of a track roller assembly utilizing face seal assembly in accordance with this invention.

FIG. 2 is an enlarged, fragmentary view of the portion of the track roller assembly of FIG. 1 within the circle 2 of FIG. 1.

BEST MODE FOR CARRYING OUT THE INVENTION

FIG. 1 illustrates a track roller assembly, generally designated 10, for use in a tracked machine, such as a track-type tractor, excavator, or the like. As well known, the roller assembly 10 is mounted by conventional means between the track roller frame (not shown) and the track (not shown) of the tracked machine. The roller assembly 10 comprises a conventional roller element 12 rotatably mounted on a shaft 14. A pair of bearing sleeves 16 lines the inner wall of the roller element 12 to provide a durable wear surface. The roller element 12 is confined between a pair of collars 18 aligned with a bore 24 through the shaft 14. As a result, the collars 18 are fixed axial movement or play of the roller element 12 between the collars 18 is permitted.

When reference to FIGS. 1 and 2, a face seal assembly, generally designated 30, is provide between the roller element 12 and each of the end collars 18. As well known, the face seal assemblies 30 are provided to retain lubricant, such as oil, in the vicinity of the bearing surfaces between the roller element 12 and the shaft 14 and also prevent foreign matter from reaching such bearing surfaces. Because each of the face seal assemblies 30 may be substantially identical, only one of the seal assemblies 30 is described in further detail herein.

Referring particularly to FIG. 2, the seal assembly 30 comprises a first, static seal ring 32 and a second, dynamic seal ring 34 each made from metal or other suitable durable, hard material. The static seal ring 32 is press fit into a bore 36 in the roller element 12 such that the static seal ring 32 is axially fixed with respect to the roller element 12 and rotates therewith. An elastomeric O-ring 38 is trapped between the static ring 32 and the bore 36 to provide a fluid-tight seal therebetween. The dynamic seal ring 34 is confined axially between the static seal ring 32 and the confronting end collar 18.

The static ring 32 has a smooth seal face 40 which confronts and engages a smooth seal face 42 on the dynamic ring 34. The plane of engagement between the seal faces 40 and 42 is referred to herein as the “seal plane”. The seal faces 40 and 42 are maintained in constant sealing engagement by way of an elastomeric load ring or toric 44 compressed between the dynamic ring 34 and the collar 18. More particularly, the dynamic ring has an annular ramp 46 formed thereon which confronts an annular ramp 48 formed on the collar 18. As the roller element 12 moves axially between the collars 18, the resilient toric 44 applies force against the ramp 46 of the dynamic ring 34, thereby forcing the dynamic ring 34 against the static ring 32. As a result, if the static ring 32 moves away from the collar 18, the toric 44 cause the dynamic ring 34 to also move away from the collar 18 to thereby maintain the sealing engagement between the seal faces 40 and 42.

The length of the ramps 46 and 48 is selected so that a predetermined compression of the toric 44 is maintained, thus providing the desired face load on the seal faces 40 and 42. More particularly, the toric 44 is compressed upon assembly to its maximum strain level, which can be substantially maintained throughout the range of movement of the dynamic ring 34 by providing sufficient length to the ramps 46 and 48. The presently preferred toric 44 has a maximum strain level of approximately 30% compression, and the toric compression is maintained in the range of 29% to 31%, depending on the deflection of the dynamic ring 34 relative to the collar 18.

In accordance with this invention, the ramps 46 and 48 are angled such that they converge in a direction away from the seal plane. More particularly, as shown in FIG. 2, the ramp 46 preferably extends at an 8 degree angle relative to a plane perpendicular to the seal face 42 of the dynamic ring 34, and the ramp 48 preferably extends at a 10 degree angle relative to a plane perpendicular to the seal face 42 of the dynamic ring. (These planes are parallel to the axis of rotation of the roller element 12 in the illustrated embodiment.) Of course, other angles that converge in a direction away from the seal plane could also be used. In this regard, it should be noted that the term "converge" is not used in the sense that the ramps 46 and 48 necessarily physically intersect, but that they would intersect if extended farther away from the seal plane.

As explained above, the converging angle of the ramps 46 and 48 provides good resistance to external force on the toric 44, such as force from mud packing, for example. The preferred converging angle also provides relatively flat load vs. deflection characteristics so that seal face loading does not change substantially as the dynamic ring 34 moves axially relative to the collar 18.

INDUSTRIAL APPLICABILITY

In use, the seal assemblies 30 prevent leakage of lubricant from the track roller assembly 10 and prevent foreign matter from reaching the rotating bearing surfaces thereof. The disclosed seal assembly construction permits the use of ramps 46 and 48 longer than the ramps of similar known seal assemblies without requiring more axial space for the seal components than such known seal assemblies. The longer ramps 46 and 48 permit optimal compression of the toric to be achieved and maintained to thereby provide the desired face loads. Since the axial length of the seal assembly 30 is not increased to achieve optimal toric compression, seal assemblies 30 can be readily retrofitted into existing seal applications without substantial and expensive design modification to the structure surrounding the seal components.

In addition, the use of a static seal 32 press fit into the roller element 12 permits through-hardening of the roller element 12 because the bore 36 can be plunge-cut after heat-treating. In contrast, if two dynamic seal rings were used in each seal assembly, an angled ramp would have to be machined into the roller element 12. Because such machining typically takes place after heat-treating, the hardness of the material after heat treating would have to be limited such that machining of the ramps is still possible.

Although the presently preferred embodiments of this invention have been described, it will be understood that within the purview of the invention various changes may be made within the scope of the following claims.

What is claimed is:

1. A face seal assembly, comprising:

a first seal ring axially fixed to a rotatable element for rotation therewith about an axis, said first seal ring having a seal face;

an annular housing member spaced axially from said first seal ring and rotationally fixed with respect to said axis, said annular housing member having an axially-extending ramp;

a second seal ring disposed axially intermediate said first seal ring and said annular housing member, said second seal ring having a seal face confronting and in mutual sealing engagement with the seal face of said first seal ring such that said seal faces define a seal plane, said second seal ring further having an axially-extending ramp confronting the ramp of said annular housing member;

said ramps converging in a direction away from said seal plane; and a bias member compressed between the ramp of said housing member and the ramp of said second seal ring.

2. The seal assembly of claim 1 wherein the ramp of said second seal ring faces generally radially outwardly and wherein the ramp of said annular housing member faces generally radially inwardly.

3. The seal assembly of claim 1 wherein one of said loading ramps is angled at 8 degrees relative to a plane perpendicular to the seal face of said second seal ring and the other of said loading ramps is angled at 10 degrees relative to said plane perpendicular to the seal face of said second seal ring.

4. The seal assembly of claim 3 wherein the loading ramp of said second seal ring is angled at 8 degrees relative said plane perpendicular to the seal face of said second seal ring.

5. The seal assembly of claim 1 wherein said bias member comprises a resilient load ring.

6. The seal assembly of claim 5 wherein said ramps have predetermined lengths, which lengths are such that said ramps maintain a desired predetermined compression of said load ring.

7. The seal assembly claim 6 wherein said ramps maintain said load ring compressed to substantially its maximum strain level.

8. The seal assembly of claim 7 wherein said load ring is compressed in the range of substantially 29% to substantially 31% from its free, uncompressed state.

9. The seal assembly of claim 1 wherein said rotatable element comprises the roller of a track roller assembly of a tracked machine and said annular housing member comprises an end collar of said track roller assembly.

10. A face seal assembly, comprising:

a first seal ring rotatable about an axis, said first seal ring having a seal face;

an annular housing member spaced axially from said first seal ring and rotationally fixed with respect to said axis, said annular housing member having an axially-extending ramp; and a second seal ring disposed axially intermediate said first seal ring and said annular housing member, said second seal ring having a seal face confronting and in mutual sealing engagement with the seal face of said first seal ring such that said seal faces define a seal plane, said second seal ring further having an axially-extending ramp confronting the ramp of said annular housing member;

a bias member compressed between the ramp of said housing member and the ramp of said second seal ring;

said seal assembly being characterized in that said first seal ring is axially fixed to a rotating element for rotation therewith about said axis and said ramps converge in a direction away from said seal plane.

* * * * *